US006912622B2

(12) United States Patent
Miller

(10) Patent No.: US 6,912,622 B2
(45) Date of Patent: Jun. 28, 2005

(54) MULTI-LEVEL CACHE ARCHITECTURE AND CACHE MANAGEMENT METHOD FOR PEER-TO-PEER NAME RESOLUTION PROTOCOL

(75) Inventor: John L. Miller, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 435 days.

(21) Appl. No.: 10/122,863

(22) Filed: Apr. 15, 2002

(65) Prior Publication Data

US 2003/0196060 A1 Oct. 16, 2003

(51) Int. Cl.$^7$ .............................................. G06F 12/08
(52) U.S. Cl. ...................... 711/129; 709/204; 709/212; 709/230; 711/122; 711/180; 711/173
(58) Field of Search ................................. 709/200, 204, 709/205, 206, 207, 212, 216, 217, 218, 219, 220, 227, 228, 229, 230, 237; 711/122, 129, 130, 170, 173

(56) References Cited

U.S. PATENT DOCUMENTS

| | | | |
|---|---|---|---|
| 5,987,376 A | | 11/1999 | Olson et al. |
| 2002/0143989 A1 | * | 10/2002 | Huitema et al. ............ 709/243 |
| 2003/0055892 A1 | * | 3/2003 | Huitema et al. ............ 709/204 |
| 2003/0056093 A1 | * | 3/2003 | Huitema et al. ............ 713/156 |
| 2003/0056094 A1 | * | 3/2003 | Huitema et al. ............ 713/157 |

FOREIGN PATENT DOCUMENTS

| | | | |
|---|---|---|---|
| EP | 1248441 A2 | * | 10/2002 |
| JP | 2002335269 A | * | 11/2002 |

OTHER PUBLICATIONS

Huitema, Christian, "Distributed Peer–to–Peer Name Resolution", Presentation Slides from the O'Reilly Peer–to–Peer and Web Services Conference, Nov. 5, 2001.*

Adamic, Lada A., "P2P Search that Scales", pre–presentation description for talk on Nov. 7, 2001, http://conferences.oreillynet.com/cs/p2web2001/view.*

Adam Langley, *The Freenet Protocol*, The Free Network Project, at http://freenet.sourceforge.net/index.php?page=protocol (last visited May 21, 2001).

Philip J. Erdelsky, *The Birthday Paradox*, EFG, at http://www.efgh.com/math/birthday.htm (last visited Mar. 8, 2002).

*Red–Black Tree*, National Institute of Standards and Technology, at http://www.nist.gov/dads/HTML/redblack.html (last visited Mar. 5, 2002).

(Continued)

*Primary Examiner*—B. James Peikari
(74) *Attorney, Agent, or Firm*—Leydig, Voit & Mayer, Ltd.

(57) ABSTRACT

A peer-to-peer cache architecture stores peer address certificates in different cache segments according to the number of IDs being stored and their relative distance in the peer name space. The cache instantiates regions of decreased range and increased granularity as additional information from close peers is learned. In a large peer cloud where the number of instantiated IDs is not known, each succeeding cache region covers one tenth of the preceding cache region. For peers with multiple IDs registered locally, the segmented cache of the present invention combines overlapping segments of the same granularity to eliminate the duplication of information that would otherwise occur. A cache tree, an instantiated segment tree, and an uninstantiated segment tree are arranged in red-black trees to simplify the search and proper placement and instantiation of information.

28 Claims, 7 Drawing Sheets

OTHER PUBLICATIONS

Lai, Kevin, and Mary Baker, *Measuring Link Bandwidths Using a Deterministic Model of Packet Delay*, at Department of Computer Science at Stanford University, 13 pages.

Rowstron, Antony, and Peter Druschel, *Pastry: Scalable, distributed object location and routing for large–scale peer–to–peer systems*, at Microsoft Research, Ltd., St. George House and Rice University, 20 pages.

Druschel, Peter, and Antony Rowstron, *PAST: A large–scale, persistent peer–to–peer storage utility*, at Rice University and Microsoft Research, 6 pages.

Rowstron, Antony, and Peter Druschel, *Storage management and caching in PAST, a large–scale, persistent peer–to–peer storage utility*, at Microsoft Research, Ltd., St. George House and Rice University, 14 pages.

Rowstron, Antony, Anne–Marie Kermarrec, Peter Druschel, and Miguel Castro, *SCRIBE: The design of a large–scale event notification infrastructure*, at Microsoft Research, Ltd., St. George House and Rice University, 20 pages.

Dabek, Frank, Emma Brunskill, M. Frans Kaashoek, David Karger, Robert Morris, Ion Stoica, and Hari Balakrishnan, *Building Peer–to–Peer Systems With Chord, a Distributed Lookup Service*, at MIT Laboratory for Computer Science, 6 pages, at http://pdos.lcs.mit.edu/chord.

Ellison, C., *SPKI Requirements*, (The Internet Society 1999), at http://www.ietf.org/rfc/rfc2692.txt?number=2692 (last visited Aug. 6, 2001).

Ellison, Carl, Bill Frantz, Butler Lampson, Ron Rivest, Brian M. Thomas, and Tatu Ylonen, *Simple Public Key Certificate*, (Internet Draft 1999), at http://www.world.std.com/~cme/spki.txt (last visited Aug. 6, 2001).

Ellison, C., B. Frantz, B. Lampson, R. Rivest, B. Thomas, and T. Ylonen, *SPKI Certificate Theory*, (The Internet Society 1999), at http://www.ietf.org/rfc/rfc2693.txt?number=2693 (last visited Aug. 6, 2001).

\* cited by examiner

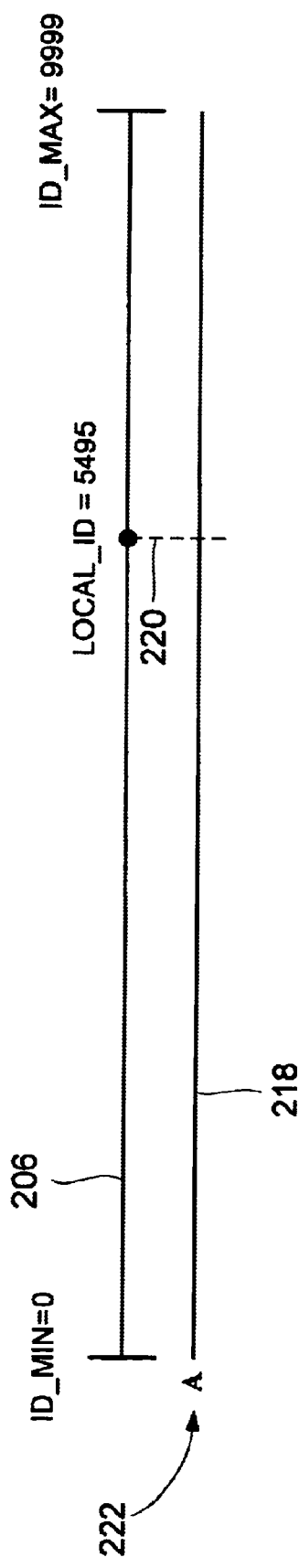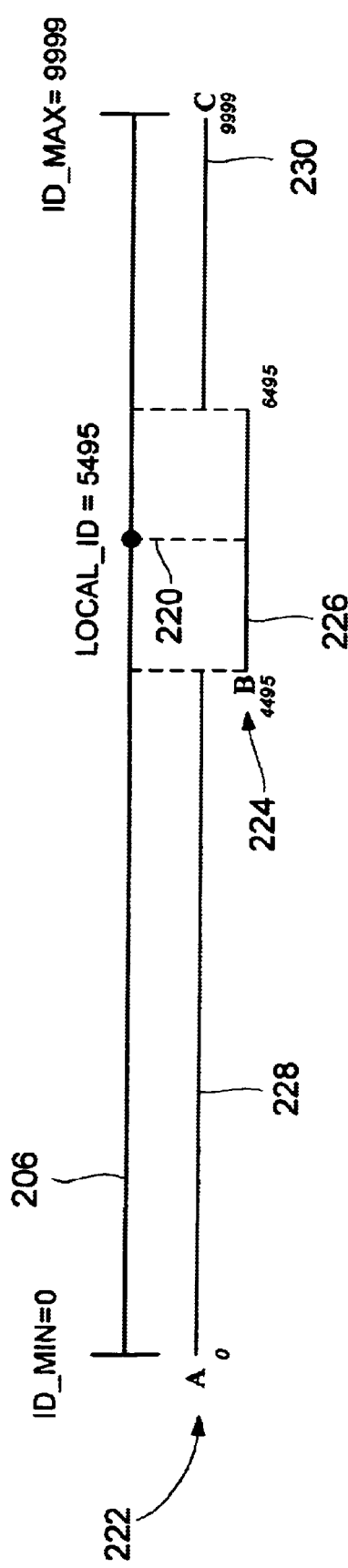

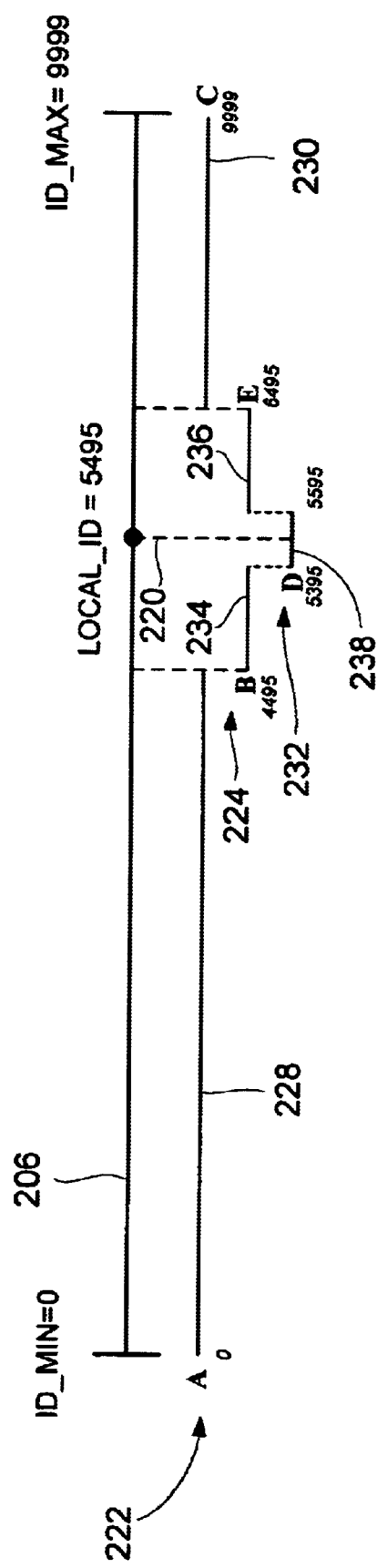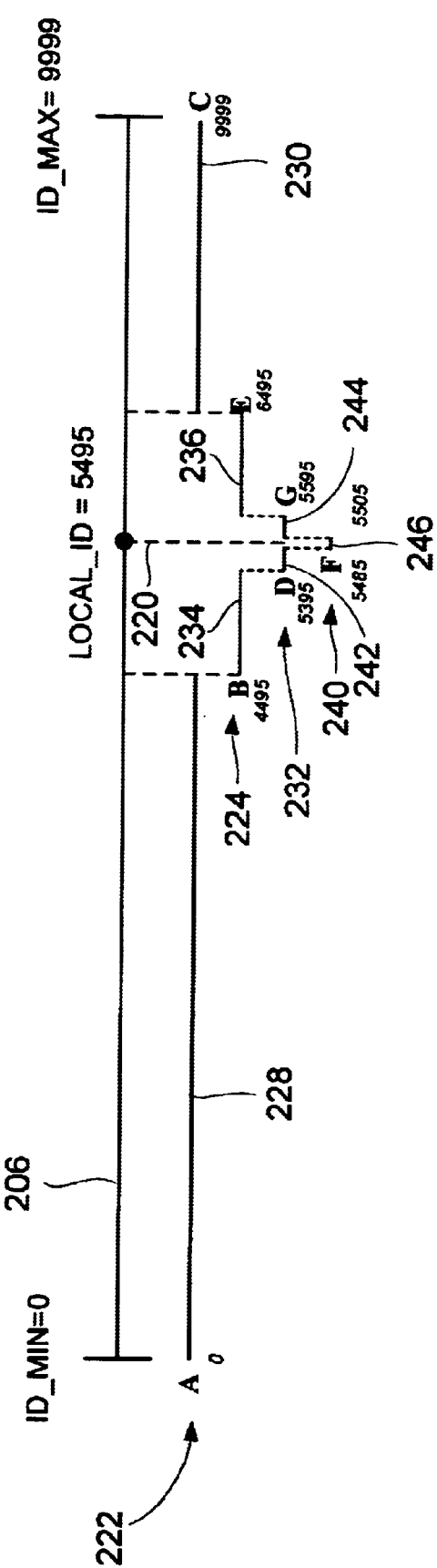

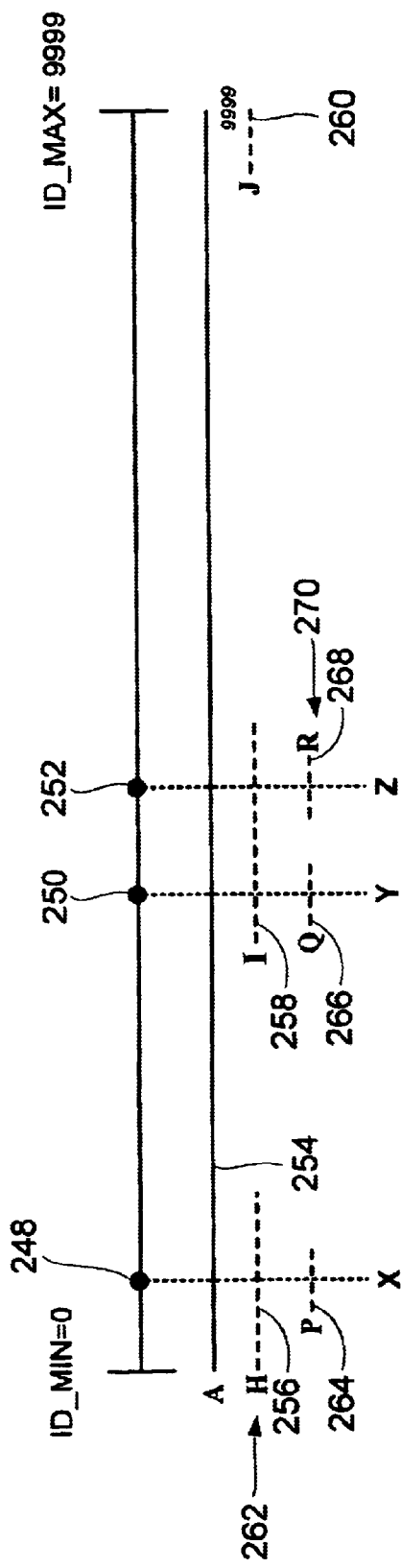
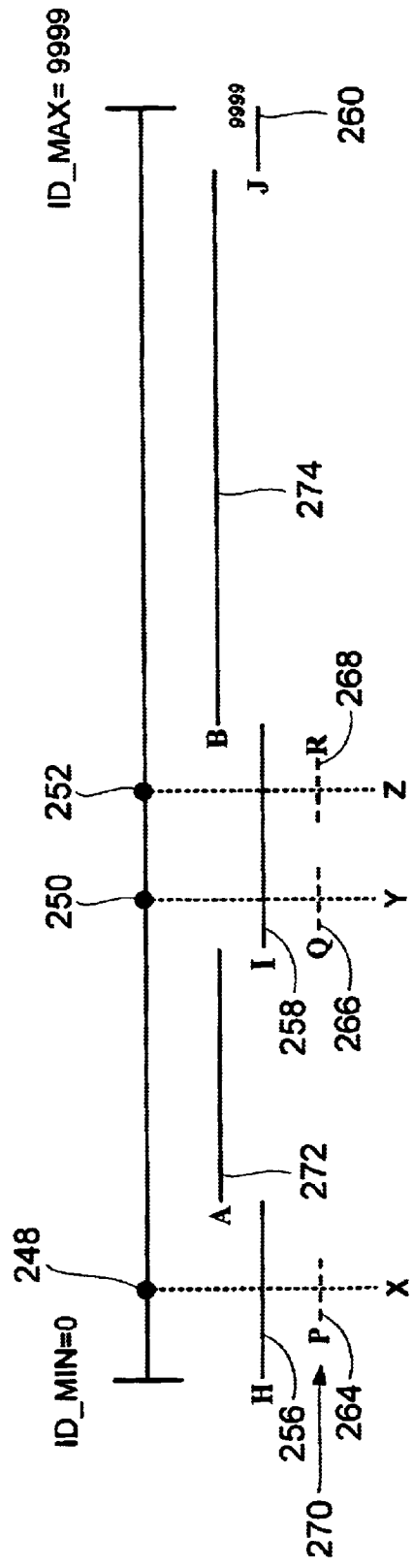

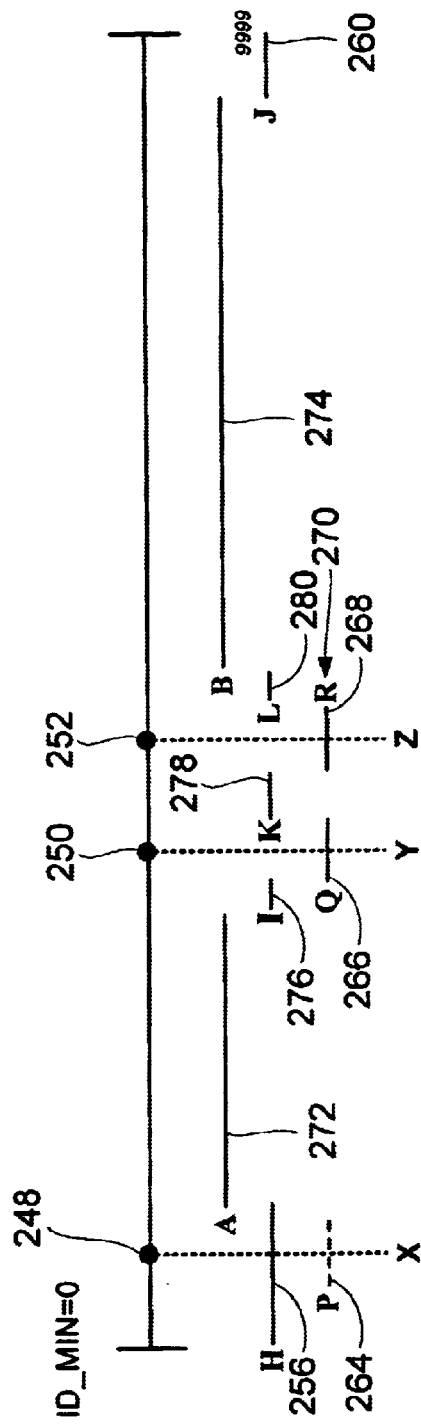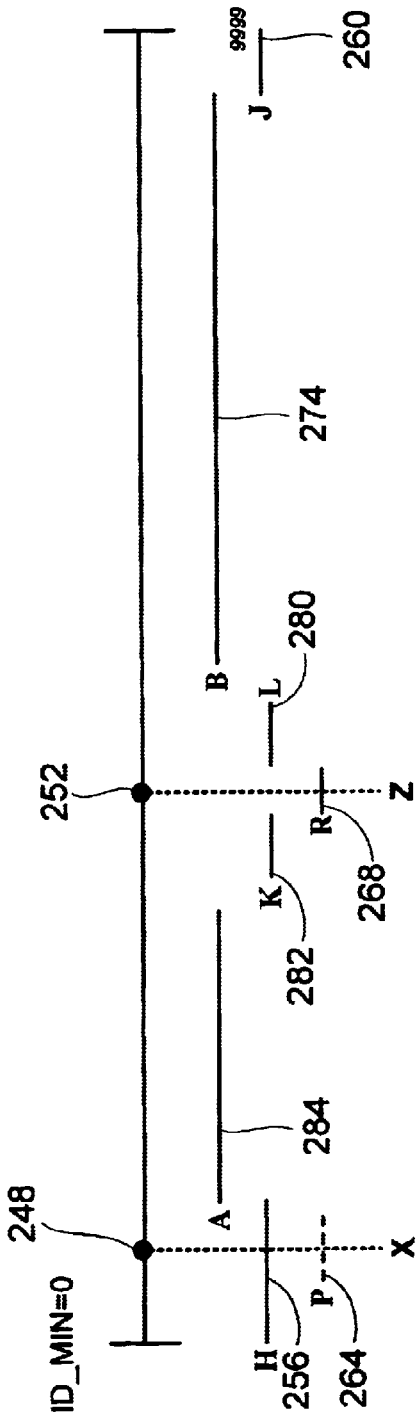

MULTI-LEVEL CACHE ARCHITECTURE AND CACHE MANAGEMENT METHOD FOR PEER-TO-PEER NAME RESOLUTION PROTOCOL

FIELD OF THE INVENTION

This invention relates generally to cache memory data structures and memory management methods and, more particularly, to cache memory storage architectures and methods for storage and sorting of peer-to-peer (P2P) name resolution information.

BACKGROUND OF THE INVENTION

Peer-to-peer (P2P) networks, which served as the foundation of the Internet, are currently experiencing a resurgence in popularity and use. The departure from the most recent server-centric driven networks, however, requires that each individual peer acquire and maintain contact and location information for the other peers and discoverable resources available on the network. While some hybrid P2P systems exist that utilize a server to act as an index or central address depository of available peers and/or resources, true P2P systems do not rely on any such servers. As such, and with the sheer number of peers and discoverable resources available on a large scale P2P network, internal management of the stored contact and directory information within each peer becomes a critically important task. Without such a management system, the peer's own memory can quickly become consumed with this contact and directory information.

Many distributed resolution mechanisms for P2P networks are designed around a structured knowledge of the name space in which peer and resource resolution is being performed. The name space knowledge that is developed and maintained is usually structured around each name that is locally registered in the name space. That is to say, information about other peers within a certain distance of the registered name is maintained in the knowledge base for each registered name. When two or more names are registered locally, there can be significant overlap between the knowledge bases maintained for each name, especially when the names are registered in close proximity to one another. This redundant knowledge consumes additional resources at each node and throughout the network. Considering that a typical peer will have several, possibly in the hundreds, of names registered (to account for each discoverable resource, file, service, application, etc. available at that peer), the resulting redundancy in knowledge bases becomes intolerable. In some cases, the pieces of information stored on a single host can exceed the number of active pieces of information in the entire name space due to the duplication of this information in the overlapping knowledge bases.

There exists a need, therefore, for a memory structure and information maintenance system that allows efficient P2P name resolution through the acquisition and maintenance of a knowledge base for registered names in the P2P namespace that does not consume excessive peer resources through the duplication of information for multiple name/resource registrations.

BRIEF SUMMARY OF THE INVENTION

In view of the above, it is an objective of the present invention to provide a new and improved cache memory structure and information management system that will allow efficient name resolution in a peer-to-peer cloud and that will not consume excessive resources even, and particularly, when there are multiple resources and/or services registered at the peer.

The segmented cache architecture of one embodiment of the present invention stores PNRP IDs in different segments according to the number of PNRP IDs being stored and their relative distance in the PNRP name space. Underlying the present invention is the statistical assumption that the probability of knowing a given PNRP ID is inversely proportional to the distance of that ID from the locally registered PNRP ID. By storing PNRP IDs in accordance with the system and method of the present invention, storing duplicate information in different caches is reduced and the number of hops required for name resolution can be reduced.

Proceeding with the statistical assumption that the peers in the name space are approximately evenly distributed throughout the name space, and knowing the number of instantiated IDs, the average spacing between peers can be determined. Based on this information, the cache regions or levels in accordance with one embodiment of the present invention may be determined relative to each locally registered PNRP ID based on this average spacing between peers. A first or lowest cache region or level will include PNRP IDs at a granularity of the average distance, and will span the range of +/− ten times the average distance from the locally registered ID. The next cache region will have PNRP IDs at a granularity of ten times the average distance, and will span the range +/− one hundred times the average distance from the locally registered ID, but excluding the first region. This magnitude increase in granularity and range will increase until the $N^{th}$ cache region. This $N^{th}$ region will contain IDs at a granularity of $10^{N-1}$ times the average distance, and will span the range $+/-10^N$ times the average distance from the locally registered ID, but excluding the previous N−1 regions. The number of cache levels required, N, is approximately equal to log(# of instantiated IDs).

In a large peer-to-peer cloud, the number of instantiated PNRP IDs may not be known or even knowable due to the dynamic nature of the peers themselves. Therefore, in an alternate embodiment of the present invention a cache segment splitting policy is implemented. In this embodiment, the highest cache region is established to cover the entire name space and to hold twenty PNRP IDs. Once this highest region is filled, the receipt of another peer address certificate (PAC) will result in a lower level cache region being instantiated. This region will cover ten percent of the next higher region centered at the locally registered ID. All information from the higher cache region within this range will be migrated to this lower cache region to eliminate any duplication of information. Once this new region is filled with twenty entries, the receipt of another PAC that fits in this region will cause the instantiation of a lower cache region as ten percent of that newly filled region. All information from the higher cache region within this range will be migrated to this lower cache region to eliminate any duplication of information. This process will continue each time the lowest level cache region becomes full and another PAC is received that fits in that region. However, if PACs are received that belong in the upper level cache regions, a cached PAC from that region must be deleted before the new PAC can be added.

Recognizing that many peers will have multiple resources and services discoverable in the P2P cloud, the cache architecture and method of an embodiment of the present invention supports multiple locally registered PNRP IDs without duplicating information in the cache. This is accomplished according to one embodiment by combining overlapping cache segments within a region since they each have the same granularity within that particular cache region. This combination does not affect the instantiation of lower level cache regions where there is no overlap.

One embodiment of the present invention utilizes a PAC cache tree, an instantiated segment tree, and an uninstantiated segment tree. The cache tree is a collection of PACs sorted by PNRP ID and organized into a binary tree, e.g. a red-black tree in one embodiment, to simplify insertion, location, and deletion of PACs. The instantiated segment tree is a collection of pointers indicating the starting address of each instantiated segment in the cache architecture. This instantiated segment tree is also preferably organized into a red-black tree to simplify searching for the appropriate cache segment into which a newly received PAC belongs. The uninstantiated segment tree contains the next cache segments to be instantiated if the next higher cache segment with which it overlaps becomes full. In one embodiment, only the cache segments that are in the next immediate cache region are included in the uninstantiated segment tree.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIGS. 4A–D are graphical illustrations of the successive instantiation of cache regions and segments in accordance with a segment splitting policy of an embodiment of the present invention as additional peer address certificates (PACs) are received in relation to a single locally registered PNRP ID in a simplified peer-to-peer number space;

FIGS. 5A–D are graphical illustrations of the successive instantiation of cache regions and segments in accordance with a segment splitting policy of an embodiment of the present invention as additional peer address certificates (PACs) are received in relation to multiple locally registered PNRP IDs in a simplified peer-to-peer number space and of the surrender of cache regions and segments upon the removal of a locally registered PNRP ID.

DETAILED DESCRIPTION OF THE INVENTION

Figure 1:
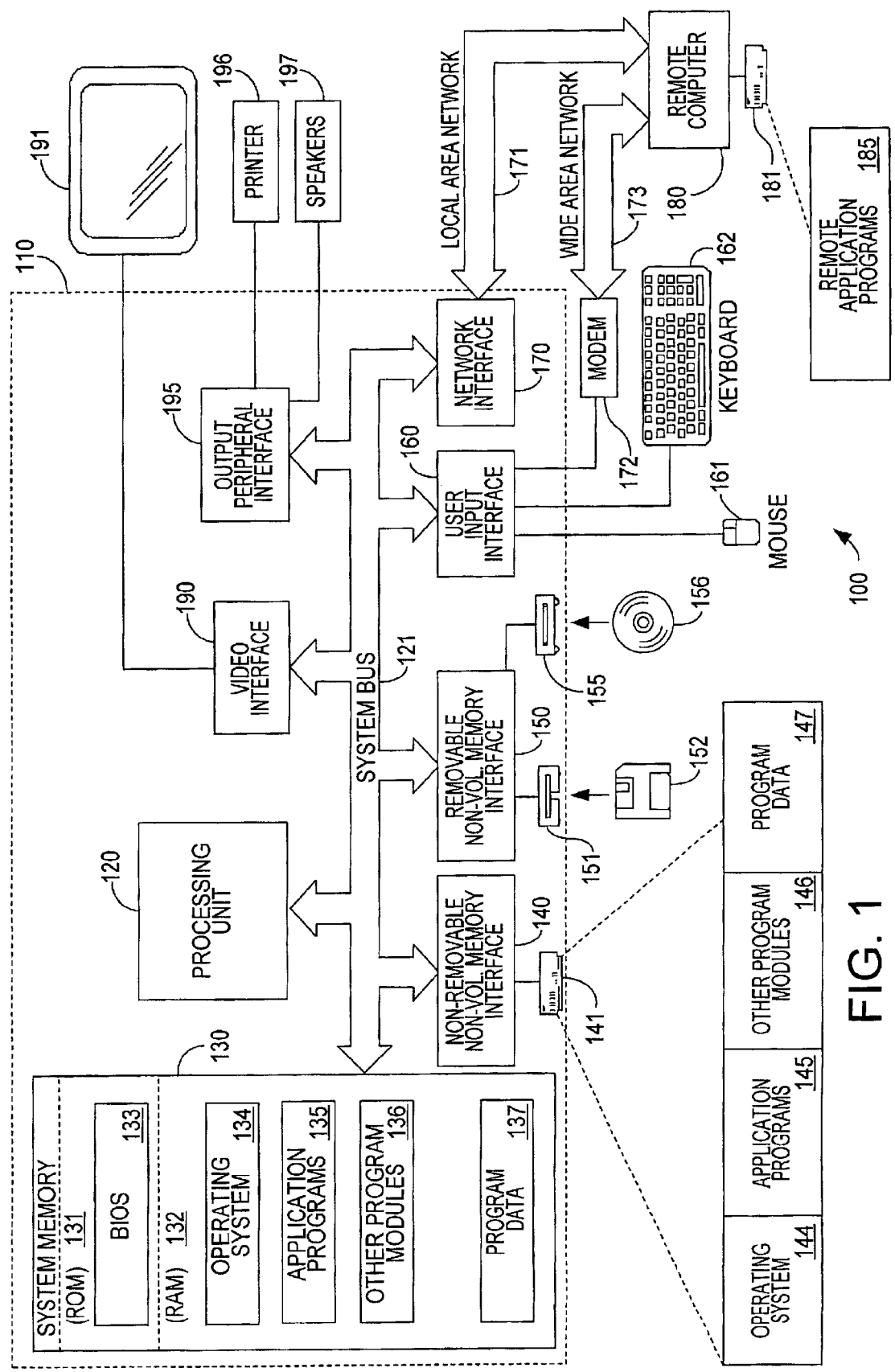
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

A truly server-less or peer-to-peer (P2P) name resolution protocol for which the present invention is particularly well suited is described in co-pending application Ser. No. 09/942,164, entitled PEER-TO-PEER NAME RESOLUTION PROTOCOL (PNRP) AND MULTILEVEL CACHE FOR USE THEREWITH, filed Aug. 29, 2001, and assigned to the assignee of the instant application, the teachings and disclosure of which are hereby incorporated in their entireties by reference thereto. This PNRP ensures convergence in large P2P networks through two mechanisms: a multilevel cache and a proactive cache initialization strategy. The multilevel cache allows the protocol to adapt to networks of various sizes, and grows only as the logarithm of the size of the network (not linearly as required by prior peer-to-peer protocols). The multilevel cache is built based on an underlying concept of a circular number space. Each level in the cache contains information from different levels of slivers of the circular space. The number of levels in the cache is dependent on the size of the network to which it is attached. However, since this size is not known, a mechanism is included to add a level to the multilevel cache when the node determines that the last level is full. In this way, rapid convergence is assured.

Generally, the PNRP cache is a collection of peer address certificates (PACs) representing knowledge about select participants in the PNRP cloud. From the PNRP cache perspective, each PAC in the cache pairs a PNRP ID with a PNRP network endpoint. PNRP IDs are 256-bit unsigned integers composed of two fields, a P2P ID and a service location. As discussed in the above identified application, the P2P ID is a cryptographic hash of a P2P name, and is the most significant 128 bits of a PNRP ID. The cryptographic hash ensures P2P IDs are randomly distributed in the $2^{128}$ number space. The service location is the least significant 128 bits of a PNRP ID. Its most significant 64 bits are a 0-padded IPv4 address, or the aggregator from an IPv6 address. The remaining 64 bits are a hash of the IP address, port, protocol, and public key which will be used to create a PAC for this ID. The IP address in service location induces structure in this portion of a PNRP ID. However, the association of P2P IDs with service locations may be considered randomly distributed, making PNRP IDs as a whole randomly distributed.

Since PNRP IDs are unsigned integers, IDs may be arithmetically compared. 'Distance' is measured by the arithmetic difference between two IDs modulo the PNRP ID number space, or $2^{256}$. DistID( ), the distance between two IDs, can be calculated in modulo arithmetic as the minimum arithmetic distance between the IDs modulo ID_MAX as follows:

$$DistID=MIN(\{(A-B)modID\_MAX\},\{(B-A)modID\_MAX\}) \quad (1)$$

Figure 2:
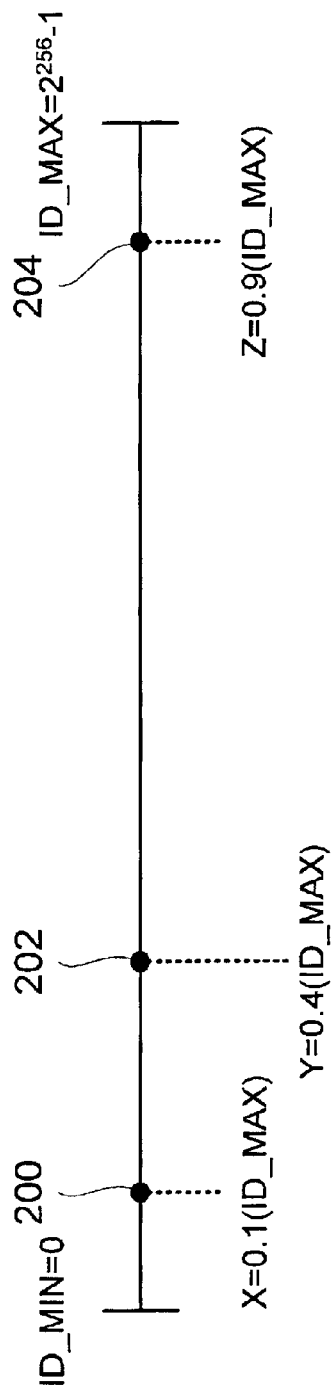
FIG. 2 is a peer-to-peer number space line diagram illustrating the concept of distance between peers modulo ID_MAX.

For example, suppose there are three PNRP IDs, X 200, Y 202, and Z 204 as shown in FIG. 2. In this diagram, X 200 is closer to Z 204 than it is to Y 202. Mathematically, the DistID(X,Z)=0.2*ID_MAX, while DistID(X,Y)=0.3*ID_MAX.

PNRP relies on random distribution of PNRP IDs through the ID number space. Assuming such a random distribution with a number space that is $2^{256}$ wide, if there were, e.g., $2^4$ instantiated PNRP IDs, then on average the randomly instantiated IDs will be $(2^{256}/2^4)=2^{252}$ away from the next closest instantiated ID. This is not a requirement for every PNRP ID, but rather it is an expectation for 'typical' ID distribution under PNRP. Despite the fact that the PNRP number space has a width of $2^{256}$, to aid in the understanding of the cache management of the present invention, the remaining discussion will describe algorithms and functionality in a simplified PNRP ID space. This simplified space will consist of IDs between 0 and 9999 (instead of 0 to $2^{256}$), i.e. the group of integers modulo 10000. This will make the mathematics easier to understand. The first two digits correspond to P2P ID, and the last two digits correspond to service location.

PNRP is an application-level routing protocol. The protocol is designed to route a resolution request (RESOLVE) to the owner of the target ID being resolved. In the ideal case, each PNPR host which touches a RESOLVE request is able to reduce the distance to the target ID by an order of magnitude. To achieve this order of magnitude reduction it is recognized that the magnitude of reduction provided is $log_{(base\_K/2)}=log_{((base\ \#\ of\ entries\ in\ cache)/2)}$. Therefore, to achieve an order of magnitude reduction at each level, the cache is populated with K=20 entries. In general, however, the system of the present invention may provide a user selectable magnitude of reduction by selecting K in accordance with the logarithmic function just discussed, and having each cache region cover 1/(K/2) of the number space that the previous region covered allowing K entries to be stored therein.

For example, suppose that the owner of PNRP ID J=1234 wants to resolve PNRP ID Z=5432. J is 4198 away from Z, as measured by DistID(J,Z)=MIN({1234-5432 mod 10000}, {5432-1234 mod 10000})=MIN({5802}, {4198})=4198. J probably will not know exactly where to find Z, but should be able to forward the RESOLVE to a peer K stored in its cache that has a PNRP ID no further than (4198/10)=420 away from Z. K in turn forwards the RESOLVE to L, which is no further than (420/10)=42 away from Z. L forwards the RESOLVE to M, no further than (42/10)=4 away from Z. M then passes the RESOLVE directly to Z, who answers the RESOLVE with a RESPONSE. In this example, the number of hops is log(ID_MAX). In one embodiment, the number of hops is actually log(# of instantiated IDs). If there are only 100 active PNRP IDs in this simplified number space, resolution should take log(100)=2 hops, not log(10,000)=4 hops. This is counter-intuitive, but the example below should help explain.

Suppose there are only 100 active PNRP IDs instantiated in the P2P cloud. With an expectation that these IDs are evenly distributed in the PNRP ID space, it may be assumed that there exists an average spacing of 100 between each peer as calculated by the equation:

$$AverageSpacing = \frac{(ID\_MAX - ID\_MIN + 1)}{NumActiveIDs} = \frac{10000}{100} = 100 \quad (2)$$

In the above example, there probably are not IDs L and M because statistically IDs within 42 or 4 of Z are unlikely to exist. Instead, K would know Z's address because Z's relative proximity to K. Another way to think about this is if there are 100 IDs in $N_{10000}$ which are 100 apart each, these can be mapped to 100 IDs in $N_{1000}$ 10 apart, or even to 100 IDs in $N_{100}$ 1 apart. Since resolution in $N_{100}$ should take two hops (log(100)=2), as the example in $N_{10000}$ with 100 instantiated IDs did above.

In order to have these properties, the cache needs to be carefully structured. An ideal cache has a distribution of knowledge such that the probability of knowing a given PNRP ID is inversely proportional to the distance of that ID from the locally registered PNRP ID. The instantiation of the cache of the present invention applies a stepping function to this requirement. Suppose there are 1000 instantiated PNRP IDs, each an average of DIST_AVG=10 apart. A cache should have PACs for the ten closest instantiated IDs in each direction (i.e. less than, greater than) from itself in the region

[ID_LOCAL−(DIST_AVG*10$^1$), ID_LOCAL+(DIST_AVG*10$^1$)].     (3)

This implies an average distance between PACs in this level of DIST_AVG*10$^0$. This first region is populated with 20 PACs. The next level of granularity is the region

[ID_LOCAL−(DIST_AVG*10$^2$), ID_LOCAL+(DIST_AVG*10$^2$),     (4)

but excluding the first region. The exclusion sums to $\frac{1}{10}^{th}$ of the range of this second region. Since 10% of the area of this cache region is excluded, the cache should have PACs for 90% of 20=18 IDs in this region. This implies an average distance between those PACs of (DIST_AVG*10$^1$). This process continues until the least granular region N is reached. This last level N has PACs in the region

[ID_LOCAL−(DIST_AVG*10$^N$), ID_LOCAL+(DIST_AVG*10$^N$),     (5)

but excluding the first through the N−1$^{st}$ regions. These exclusions sum to $\frac{1}{10}^{th}$ of the range of this N$^{th}$ region. As such, the N$^{th}$ region cache should have PACs for 90% of 20=18 IDs in this range, which implies an average distance between those PACs of (DIST_AVG*10$^{N-1}$). In the complete PNRP number space of $2^{256}$, the number of cache regions would be log($2^{256}$), which is approximately equal to 78 cache regions. However, the existence of a statistical phenomenon known as the Birthday Paradox applied to the PNRP number space reduces the actual number of active PNRP names that will likely exist to approximately the square root of $2^{256}$, or only about $2^{128}$ active names. As a result, the number of cache regions would actually be based on the log($2^{128}$), which is approximately equal to 38 cache regions.

This cache structure enables efficient RESOLVE routing based on PNRP ID proximity. For each locally registered PNRP ID, a peer should be able to forward the RESOLVE request an order of magnitude closer to its destination. The rules above are almost enough to ensure this, However, in order for resolution to converge, each region of cache should have its entries approximately evenly spaced. The even spacing allows statistical guarantees to be made about maximum distance an ID to resolve is from a cache entry. Specifically, the regions are structured such that any ID randomly picked in any region will be no more than $\frac{1}{10}^{th}$ the region size from a cached PAC entry in that region. In the ideal case having 20 evenly spaced cached PAC entries, any ID randomly picked in the region will be no more than $\frac{1}{40}^{th}$ the region size from a cached PAC entry in that region. That is, because there are 20 evenly spaced entries in a region (one every $\frac{1}{20}^{th}$ of the region) and because any randomly picked ID cannot be further away from an entry by ½ the distance between two consecutive entries, no randomly picked ID can be more than $\frac{1}{20}*\frac{1}{2}=\frac{1}{40}$ the region size from a cached PAC entry in that region. Cache regions are organized according to the present invention into segments to meet the cache content requirements, and to efficiently handle the case where multiple local PNRP IDs are regis-tered and supported by a single cache as will be discussed more fully below.

Figure 3:
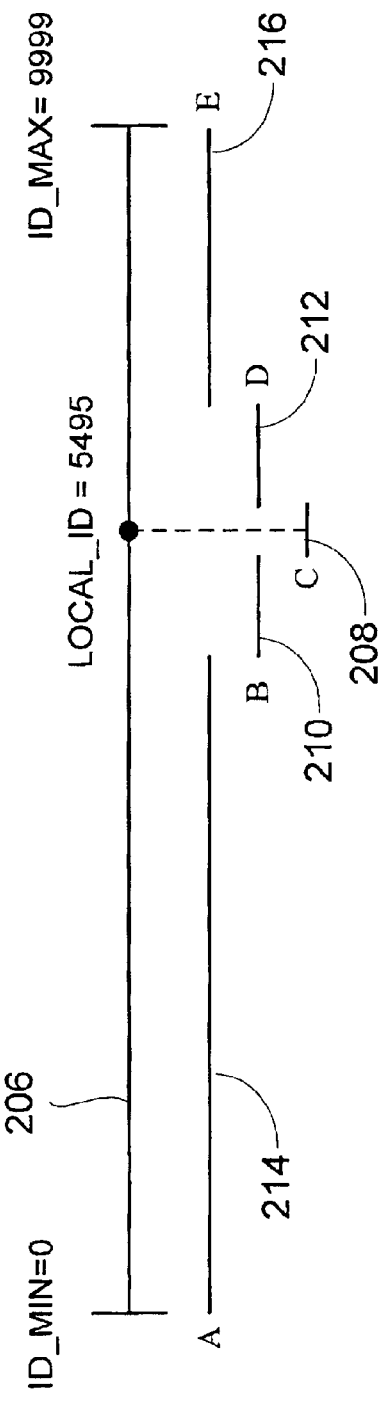
FIG. 3 is a graphical illustration of cache regions and segments instantiated in accordance with an embodiment of the present invention in relation to a locally registered PNRP ID in a simplified peer-to-peer number space.

A peer preferably includes a supporting cache for each one of its published PNRP IDs. The cache contains PACs with strategically selected PNRP IDs. The cache is composed of a list of segments which are non-overlapping intervals that cover the entire ID space. Each segment contains a list of PACs sorted by PNRP ID. As shown in FIG. 3, a sample PNRP ID number space 206 from 0 to 9999 is divided into cache segments A through E. The union of segments displayed on the same horizontal plane correspond to a single region as defined above. Segment C 208 is corresponds to region 1, segment B 210+segment D 212 corresponds to region 2, and segment A 214+segment E 216 corresponds to region N=3. Consequently, the proportions for segments in this Figure are (A+E)=10*(B+D)=111*C. C 208 has a different size because while region 3 and region 2 each have 10% of their breadth taken by exclusions for lower regions, region C 208 has no such exclusions. As such, it is has a relative size of (100/90)=1.11 compared to the other regions.

Each segment in the cache of the present invention is characterized by two attributes, range and ideal spacing (or just spacing). Range is the starting and ending point of a segment. Spacing is the ideal PNRP ID distance between adjacent PACs in the segment. Range and ideal spacing are used to calculate the number of PACs allowed in a segment. The formula is $$PACCapacity = \frac{SegmentEnd - SegmentStart + 1}{IdealSpacing} \quad (6)$$

For example, a segment for IDs 5000 to 5449 with an ideal spacing of 50 could contain up to (5449−5000+1)/50=9 PACs.

In one embodiment of the present invention, the cache is preferably structured according to the number of instantiated IDs, not the total number space. The number of instantiated IDs determines how many regions are needed, and therefore how many segments are needed. For a cache servicing a single locally registered ID, the number of regions will be log(# instantiated IDs), and the number of segments will be 2*(regions)−1. As an example, assume that there are 2,000 instantiated PNRP IDs in the simplified number space of 0–9999. Then the number of regions are log(2000)=3 regions, and the number of segments is 2*(3)−1=5.

If a local ID 218 is registered at ID=5459, the first region (segment C 208 in FIG. 3) spans IDs +/−DIST_AVE*10$^1$ in accordance with equation (3), with an average spacing within the cache region of DIST_AVE*10$^0$. With a number space of 0–9999 having 2000 instantiated IDs, the DIST_AVE=10,000/2000=5. Therefore, segment C 208 will span IDs 5495−50=5445 to 5495+50=5545, with an average spacing between IDs of 5, and a PAC capacity of 20 IDs within this region according to equation (6) above.

The next region, in accordance with equation (4) above, will range from 5495−500=4995 to 5495+500=5995, less segment C 208, with an average spacing between IDs of 50. Therefore, segment B 210 will range from 4995 to 5444, with a PAC capacity of 9 in accordance with equation (6) above, and segment D 212 will range from 5546 to 5995, with a PAC capacity of 9.

The third and final region, in accordance with equation (5) above, will range from 5495−5000=495 to (5495+5000) mod 10,000=495 less segments B 210, C 208, and D 212. However, since this region wraps around the circular number space (mod 10,000), segment A 214 may be thought of as covering the range from 0 to 4994 while segment E 216 may be thought of as covering the range from 5996 to 9999. As a result, segment A 214 will have a PAC capacity of 10, while segment E 216 will only have a PAC capacity of 8, each with an average spacing of 500.

Unfortunately, in a large scale P2P network cloud there is no way to know the number of instantiated ID. This is especially true when the dynamic nature of the peers in such a cloud is considered. Instead, the system of the present invention relies on the random distribution of PNRP IDs and a segment splitting policy to structure the cache appropriately. In accordance with this policy, an initial cache segment A 218, is illustrated in FIG. 4A created that covers the entire number space and can hold up to 20 PACs. If less than 20 IDs are active in the cloud, segment A 218 will never overflow, and the cache will stay at one region 222. FIG. 4A shows segment A 218 with 20 PACs evenly distributed throughout the number space, and a vertical dashed line 220 corresponding to the locally registered PNRP ID of 5495.

When a new PAC with a PNRP ID not already in the cache is received, PNRP knows that the information space requires service instances to specialize with at least two regions. There may ultimately be a need for more regions, but the cache management method of the present invention will wait for that need to be proven before acting upon it. This method utilizes three data structures organized into red-black trees (symmetric binary B-trees) to simplify this procedure. These data structures include a PAC cache tree, an instantiated segment tree, and an uninstantiated segment tree. The PAC cache tree is simply a collection of the PACs, sorted by the PNRP ID and arranged into a red-black tree. This allows easy insertion, location, and deletion of PACs within $O(lg_2 N)$. Since the PAC cache tree is sorted by PNRP ID, PACs corresponding to each segment are continuous as encountered while traversing the tree.

An instantiated segment structure is also maintained for each logical cache segment that has been instantiated. This segment list includes the segment minimum and maximum bounds (range), the expected spacing between entries, and a red-black instantiated segment tree. This instantiated segment tree contains pointers to nodes in the PAC cache tree corresponding to the PNRP ID of the PAC that is the start of that segment. This instantiated segment tree is used to determine in which segment a newly acquired PAC belongs.

An uninstantiated segment tree is also maintained by the system of the present invention. This uninstantiated segment tree contains a listing of the next segment(s) in the next region that could be instantiated if the next higher region is filled and another PAC is received for that region. That is, the system of the present invention checks the uninstantiated segment tree if a PAC is received which would belong in a full segment to see if there exists an uninstantiated segment (s) in the next lower region that overlaps the full segment. If so, then the system of the present invention instantiates the new segment(s) as will be described more fully below, moves the new segment from the uninstantiated segment tree to the instantiated segment tree, and calculates the next uninstantiated segment(s) for the uninstantiated segment tree.

Returning to the present example, the system of the present invention creates a second region 224 when region 1 222 is full and another PAC is received. This is determined by looking to the uninstantiated segment tree and noting that segment B 226 overlaps the now full segment A 218. As such, the number space previously taken by segment A 218 in FIG. 4A is subdivided into segments A 228, B 226, and C 230 illustrated in FIG. 4B. Segments A 228 and C 230 make up region 1 222, and segment B 226 makes up region 2 224. The endpoints for segment B 226 are determined by taking 10% of the number space of region 1 222, centered at the locally registered ID 220. In this exemplary number space, segment B 226 would span 5495+/−1000 or from 4495 to 6495, segment A 228 would span 0 to 4494, and segment C 230 would span 6496 to 9999. Segments are non-overlapping, and all PACs are migrated into the segment which covers their portion of the PNRP ID space 206.

Now assume that segments A 228 and C 230 are each full. If a new PAC is added in the range of either of those segments, it will have to replace a PAC already cached in that segment in accordance with the PNRP management described in the application discussed above because the uninstantiated segment tree will indicate that there are no uninstantiated segments that overlap these segments. Segment B 226 is in region 2 224, which means that its spacing is $\frac{1}{10}^{th}$ that of segments A 228 and C 230. Consequently, region B 224 has a capacity of 20 PACs. Since it is only holding 2 PACs after its instantiation, it can accept another 18 before becoming full. If PNRP IDs are well distributed, there would need to be at least 200 instantiated IDs for segment B 226 to fill up because B 226 covers $\frac{1}{10}^{th}$ of the full ID number space 206, and $\frac{1}{10}^{th}$ of all registered PNRP IDs can potentially fit in its range.

If the second region 224 becomes full and another PAC is received that fits in that second region 224, then the system of the present invention will instantiate another cache region 232 listed in the uninstantiated segment tree as 10% of region 2 224, centered at the local ID 220 as illustrated in FIG. 4C. The middle $\frac{1}{10}^{th}$ of the region 224 will be split into a new region 232, and the remaining pieces of region 2 224 will form segments B 224 and E 236. This split is analogous to the split which created segments 226, 230 from the original region A 218. Specifically, segment D 238 will span 5495+/−100 or from 5395 to 5595, segment B 234 will now span 4495 to 5394, and segment E 236 will span 5596 to 6495.

Now assume that segments B 234 and E 236 are each 'full'. If a new PAC is added in the range of either of those segments, it will have to replace a PAC already cached in that segment in accordance with the PNRP management described in the application discussed above because there are no uninstantiated segments that overlap these segments. Segment D 238 is in region 3 232, which means that its spacing is $\frac{1}{10}^{th}$ that of segments B 234 and E 236. Consequently, segment D 238 has a capacity of 20 PACs. Since it is only holding 2 PACs after its instantiation, it can accept another 18 before becoming full. If PNRP IDs are well distributed, there would need to be at least 2000 instantiated IDs for segment D 238 to fill up because it covers $\frac{1}{100}^{th}$ of the full ID number space 206, and $\frac{1}{100}^{th}$ of all registered PNRP IDs can potentially fit in its range.

If region 232 becomes full and another PAC is received, then the system of the present invention will check the uninstantiated segment tree to determine if an additional region should be instantiated. Recognizing that such a segment exists, the system will instantiate another cache region 240 as 10% of region 232, centered at the local ID 220 as illustrated in FIG. 4D. The middle $\frac{1}{10}^{th}$ of the region 232 will be split into a new region 240, and the remaining pieces of region 232 will form segments D 242 and G 244. This split is analogous to the split which created segments 238, 236 from region 224. Specifically, segment F 246 will span 5495+/−10 or from 5485 to 5505, segment D 242 will now span 5395 to 54844, and segment G 244 will span 5506 to 5595.

Now assume that segments D 242 and G 244 are each 'full'. If a new PAC is added in the range of either of those segments, it will have to replace a PAC already cached in that segment in accordance with the PNRP management described in the application discussed above because there are no uninstantiated segments that overlap these segments. Segment F 246 is in region 4 240, which means that its spacing is $1/10^{th}$ that of segments D 242 and G 244. Consequently, region 240 has a capacity of 20 PACs. Since it is only holding 2 PACs after its instantiation, it can accept another 18 before becoming full. If PNRP IDs are well distributed, there would need to be at least 20000 instantiated IDs for segment F 246 to fill up because F 246 covers $1/1000^{th}$ of the full ID number space 206, and $1/1000^{th}$ of all registered PNRP IDs can potentially fit in its range. However, since this exemplary number space 206 is only 10000 wide and can therefore only have 10000 registered PNRP IDs, it is statistically unlikely in a well distributed cloud that this region will become full.

The preceding discussions focused on how to structure a cache around a single locally registered PNRP ID to provide an understanding of the concepts of the present invention. In practice each cache will typically need to support anywhere from 10 to 100 or more locally registered PNRP IDs. This is because each resource that the peer allows to be discoverable in the cloud will be registered with a PNRP ID. Indeed, each service provided by the peer will also be registered with a PNRP ID. The rules for creating segments discussed above with regard to a single PNRP ID change only slightly when multiple IDs are supported.

To illustrate this multi-ID cache management embodiment of the present invention, suppose there are three locally registered IDs, e.g. X 248, Y 250, and Z 252, supported by the same cache as illustrated in FIG. 5A. As with the previous embodiment, the cache starts out with a single segment, which in this example is now full. A 254 is the only instantiated segment in the cache at this point, and the uninstantiated segment tree lists segments H 256, I 258, and J 260 (the next uninstantiated segments). The range of the number space potentially covered by segments H-J 256–260 in region two 262 and P-R 264–268 in region three 270 are shown in FIG. 5A with dashed lines. Segments H 256, I 258, J 260, P 264, Q 266, and R 268 do not exist yet, they simply illustrate where additional segments could eventually be added if necessary. However, as discussed above, only segments H 256, I 258, and J 260 are included in the uninstantiated segment tree. Segments P, Q, and R will be added to the uninstantiated segment tree once segments H, I, and J are instantiated.

As may be seen from this particular example, the local ID X 248 is so close to ID_MIN that its region two segment, if instantiated, wraps around ID_MAX slightly as a result of the modular arithmetic (i.e. ID_LOCAL+/−$1/10$*{ID_MAX−ID_MIN+1} mod ID_MAX). To simplify the search in the segment tree discussed above, this second region is split into two segments H 256 and J 260. In this way, each of the segments H 296 and J 260 have starting addresses that are lower than their ending addresses, enabling simple linear arithmetic to be used in the search process instead of requiring modular arithmetic (mod ID_MAX).

As may also be seen from this example, the local PNRP IDs Y 250 and Z 252 are within $1/10^{th}$ of the number space of each other. As such, their potential region two 262 segments would overlap if both were instantiated. If both such segments were instantiated and separately maintained, a duplication of information would result, thus wasting resources. Since these segments will have the same granularity, the system of this embodiment of the present invention combines them into a single segment I 258. This segment I has the starting address of the start of the segment that would have been instantiated based on the local PNRP ID Y 250 (i.e. ID_LOCAL$_Y$−$1/10$*{ID_MAX−ID_MIN+1} mod ID_MAX), and has the ending address of the end of the segment that would have been instantiated based on the local PNRP ID Z 252 (i.e. ID_LOCAL$_Z$+$1/10$*{ID_MAX−ID_MIN+1} mod ID_MAX). Unlike the typical splitting of segments in a cache under the system of the present invention, the single top segment in this embodiment was split into three region-2 segments covering a little less than 30% of the number space. They cover less than 30% because Y and Z's region two segments overlap somewhat to form segment I 258.

Each segment is characterized by its range and its spacing (determined by its region). Each time a PAC is added to a segment, the segment is examined first. If the segment has room for the PAC, it is simply added. If the segment is full, then PNRP checks to see whether there are any potential (uninstantiated) segments in the next region which overlap this segment's range. In the current example, adding a PAC to segment A 254, which is full, would result in instantiation of segments H 256, I 258, and J 260, as illustrated in FIG. 5B, because each overlaps with the original segment A 254 and are in the next region 262. All instantiated segments obey the rules for segments. First, the union of all segments covers the entire number space. Second, none of the segments overlap. Segments A 272 and B 274 are full, and no potential segments overlap with them. If a PAC is to be added in either of these segments A 272 and B 274, then an entry must be deleted before the new entry can be added.

Segments H 256, I 258, and J 260 can each hold several more entries before any further splits need to be made. If segment J 260 fills up, an entry will have to be deleted in it before a new one can be added because there are no uninstantiated regions that overlap with segment J 260 in the next region. If segment H 256 fills up, however, attempting to add an additional entry to H 256 will result in instantiation of segment P 264 because uninstantiated segment P 264 overlaps segment H 256 and is in the next region. If segment I 258 fills up, attempting to add an additional entry will result in both segments Q 266 and R 268 being instantiated. This is because both of these two segments overlap with I 258 and are in the next region 270.

Figure 6:
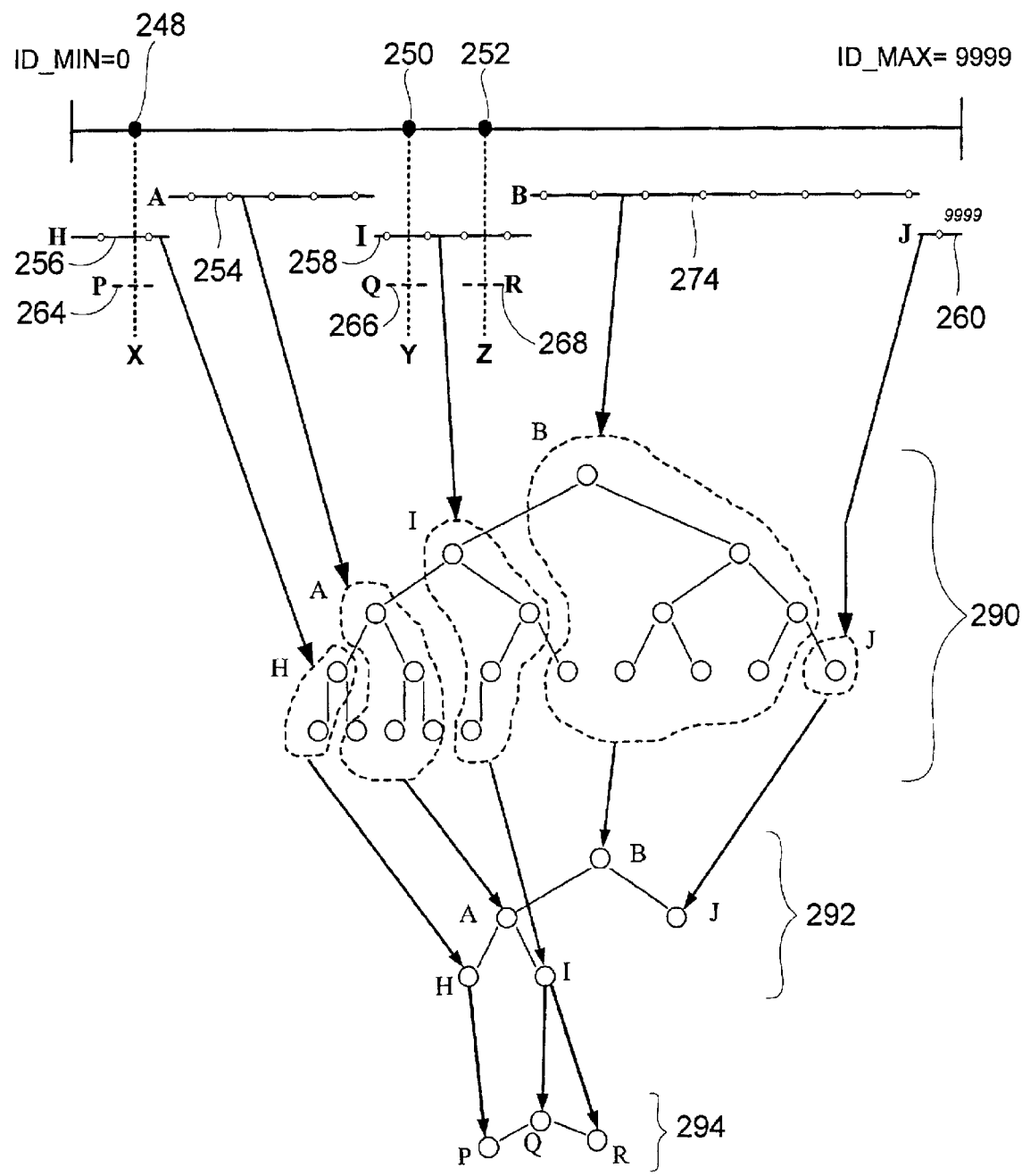
FIG. 6 is a graphical illustration of a relationship between a PAC segment tree, an instantiated segment tree, and an uninstantiated segment tree at one stage of the successive instantiation illustrated in FIG. 5B in accordance with one embodiment of the present invention.

To illustrate this point graphically, reference is directed briefly to FIG. 6, which depicts the relationship between the PAC cache tree 290, the instantiated segment tree 292, and the uninstantiated segment tree 294. As discussed above, the PAC cache tree 290 is a red-black tree that is sorted by the PNRP IDs of the PACs stored in the cache. As illustrated, each PAC currently stored in the cache is represented in the PAC cache tree 290. The instantiated segment tree 292 is also arranged into a red-black tree, but instead of containing PACs it contains pointers to the starting address of each segment instantiated in the cache. Organization into a red-black tree aids in the searching of the proper segment into which a newly received PAC should be placed. The uninstantiated segment tree 294 is also arranged into a red-black tree to simply searching, and contains only the segments in the next region of the cache that could be instantiated if the regions that they overlap become full.

Assuming that segment I 258 is full and another PAC is received having a PNRP ID that would place it in segment I 258, segments Q 266 and R 268 will be instantiated as illustrated in FIG. 5C. As a result of instantiating segments Q 266 and R 268, segment I is broken into segments I 276, K 278, and L 280.

If segments Q 266 and R 268 have been instantiated as illustrated in FIG. 5C and the resource or service registered at PNRP ID Y 250 is removed, the system of the present invention will relinquish the cache segment Q 266 to the higher level I 276. Unfortunately, since this cache segment I 276 was formed as a combination of the two overlapping segments that would have been instantiated for the close IDs Y 250 and Z 252, a portion of segment I 276 will also be relinquished to the higher segment A 284. As illustrated in FIG. 5D the remaining segments K 282 and L 280 will now only cover the range $ID\_LOCAL_Z +/-(ID\_MAX-ID\_MIN+1)$ mod $ID\_MAX$. Because the higher segments are already full, the PACs in the portions of the lower regions that are being relinquished are treated as new information to the higher segments As such, their addition to that higher segment will be dependent on the PNRP rules governing addition of information to a full segment discussed above.

If a new resource or service is registered once multiple cache segments have been instantiated, the uninstantiated segment tree is populated with the next segment that would need to be instantiated if a new PAC is received in a full region below which this new uninstantiated region overlaps. When a new PAC is received, the uninstantiated segment tree is checked as described above, and the lower level region will be instantiated if appropriate. If any overlaps with other instantiated segments exists, the segments will be combined as discussed above.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

I claim:

1. A cache memory architecture for use in a peer having at least one locally registered peer ID within a peer name space, the peer name space having a first number of peer IDs instantiated therein, wherein the first number is a positive integer greater than one, the first number of peer IDs having an average spacing therebetween, comprising:

a second number N of memory regions for storing peer IDs, wherein the second number N is a positive integer, each memory region from 1 . . . N storing peer IDs within a range of $+/-10^{1 \cdots N}$ times the average spacing from the at least one locally registered peer ID, and when N is greater than one each of the memory regions 2 . . . N excluding the peer IDs stored in preceding memory regions 1 . . . N-1; and wherein the number N of memory regions is determined approximately as the log of the first number of peer IDs instantiated in the name space.

2. The cache memory architecture of claim 1, wherein each of the N memory regions has a capacity to store a third number of peer IDs therein, wherein the third number is a positive integer, the third number for each memory region being equal to the range divided by the average spacing.

3. The cache memory architecture of claim 2, when N is greater than one, wherein the third number for each memory region from 2 . . . N is equal to the range of its associated memory region less the range of the preceding regions 1 . . . N-1.

4. The cache memory architecture of claim 1, wherein each memory region from 1 . . . N stores peer IDs having a granularity of $10^{0 \cdots N-1}$ times the average spacing.

5. The cache memory architecture of claim 1, wherein the peer has at least two locally registered peer IDs, wherein at least one of the second number of memory regions for each of the two locally registered peer IDs covers at least a common portion of the name space; and wherein the at least one of the second number of memory regions for each of the two locally registered peer IDs that covers at least a common portion of the name space is combined into a single memory region to eliminate duplication of peer IDs stored therein.

6. The cache memory architecture of claim 1, when N is greater than one, wherein each of the memory regions N-1 . . . 1 is instantiated only after a next higher memory region N . . . 2 becomes full.

7. A cache memory architecture for use in a peer having at least one locally registered peer ID within a peer name space, the peer name space having a first number of peer IDs instantiated therein, wherein the first number is a positive integer greater than one, the first number of peer IDs being approximately evenly distributed throughout the peer name space and having an average spacing therebetween, comprising:

a first memory region for storing peer IDs within a first range of +/-ten times the average spacing from the locally registered peer ID;

a second memory region for storing peer IDs within a second range of +/-one hundred times the average spacing from the locally registered peer ID excluding the peer IDs within a range of +/-ten times the average spacing from the locally registered peer ID; and a third memory region for storing peer IDs within a third range of +/-one thousand times the average spacing from the locally registered peer ID excluding the peer IDs within a range of +/-one hundred times the average spacing from the locally registered peer ID.

8. The architecture of claim 7, wherein the first memory region has a capacity to store a second number of peer IDs therein, wherein the second number is a positive integer, the second number being equal to the first range divided by the average spacing, wherein the second memory region has a capacity to store a third number of peer IDs therein, wherein the third number is a positive integer, the third number being equal to the second range minus the first range divided by the average spacing, and wherein the third memory region has a capacity to store a fourth number of peer IDs therein, wherein the fourth number is a positive integer, the fourth number being equal to the third range minus the second range divided by the average spacing.

9. The cache memory architecture of claim 7, wherein the first memory region stores peer IDs having a granularity of the average spacing, wherein the second memory region stores peer IDs having a granularity of 10 times the average spacing, and wherein the second memory region stores peer IDs having a granularity of 100 times the average spacing.

10. The cache memory architecture of claim 7, wherein the peer has at least two locally registered peer IDs, wherein at least one of the memory regions for each of the two locally registered peer IDs covers at least a common portion of the name space; and wherein the at least one of the memory regions for each of the two locally registered peer IDs that covers at least a common portion of the name space is combined into a single memory region to eliminate duplication of peer IDs stored therein.

11. A cache memory architecture for use in a peer having at least a first locally registered peer ID within a peer name space, the name space having an unknown number of peer IDs registered therein, comprising:
   a first cache memory segment for storing peer IDs instantiated anywhere in the peer name space, the first cache memory segment having a predetermined maximum number of peer IDs that may be stored therein;
   a second cache memory segment instantiated when the first cache memory segment exceeds the predetermined maximum number of peer IDs, the second cache memory segment spanning a range of one tenth the first cache memory segment centered at the first locally registered peer ID, the second cache memory segment forming an exclusion in the first cache memory segment, the second cache segment having a predetermined maximum number of peer IDs that may be stored therein; and
   a third cache memory segment instantiated when the second cache memory segment exceeds the predetermined maximum number of peer IDs, the third cache memory segment spanning a range of one tenth the second cache memory segment centered at the first locally registered peer ID, the third cache memory segment forming an exclusion in the second cache memory segment, the third cache memory segment having a predetermined maximum number of peer IDs that may be stored therein.

12. The cache memory architecture of claim 11, further comprising a fourth cache memory segment instantiated when the third cache memory segment exceeds the predetermined maximum number of peer IDs, the fourth cache memory segment spanning a range of one tenth the third cache memory segment centered at the first locally registered peer ID, the fourth cache memory segment forming an exclusion in the third cache memory segment.

13. The cache memory architecture of claim 11, wherein the peer includes at least the first and a second locally registered peer IDs, further comprising a fifth cache memory segment instantiated when the first cache memory segment exceeds the predetermined maximum number of peer IDs, the fifth cache memory segment spanning a range of one tenth the first cache memory segment centered at the second locally registered peer ID, the fifth cache memory segment forming an exclusion in the first cache memory segment, the fifth cache segment having a predetermined maximum number of peer IDs that may be stored therein.

14. The cache memory architecture of claim 13, wherein a portion of the second and the fifth cache memory segments cover a common area of the name space, and wherein the second and the fifth cache memory segments are combined into a sixth cache memory segment to prevent duplication of information.

15. The cache memory architecture of claim 14, further comprising a seventh cache memory segment instantiated when the sixth cache memory segment exceeds the predetermined maximum number, the seventh cache memory segment spanning a range of one tenth the second cache memory segment centered at the second locally registered peer ID.

16. A method of cache memory management for a segmented cache architecture used in a peer-to-peer name resolution system in which peers may register IDs in a peer name space, the system including at least one locally registered peer ID, the method comprising the steps of:
   populating a first cache segment with a number of peer IDs discovered by the peer-to-peer name resolution system;
   instantiating a second cache segment covering a fraction of the first cache segment and centered at the locally registered peer ID upon receipt of an additional peer ID discovered by the peer-to-peer name resolution system after the number of peer IDs populated in the first cache segment reaches a predetermined maximum, the instantiation of the second cache segment resulting in an exclusion in the first cache segment; and
   instantiating a third cache segment covering a fraction of the second cache segment and centered at the locally registered peer ID upon receipt of an additional peer ID discovered by the peer-to-peer name resolution system after the number of peer IDs populated in the second cache segment reaches a predetermined maximum, the instantiation of the third cache segment resulting in an exclusion in the second cache segment.

17. The method of claim 16, further comprising the steps of:
   forming a first binary tree containing all of the peer IDs discovered by the peer-to-peer name resolution system;
   forming a second binary tree containing starting addresses in the peer name space to all of the instantiated cache segments; and
   forming a third binary tree containing uninstantiated cache segments that relate to an immediately preceding instantiated cache segment.

18. The method of claim 17, further comprising the steps of:
   receiving a new peer ID discovered by the peer-to-peer name resolution system;
   searching the second binary tree to determine in which instantiated segment the new peer ID belongs;
   determining that the predetermined maximum for the instantiated segment in which the new peer ID belongs has not been reached; and
   adding the new peer ID to the instantiated segment in which the new peer ID belongs when the predetermined maximum has not yet been reached.

19. The method of claim 17, further comprising the steps of:
   receiving a new peer ID discovered by the peer-to-peer name resolution system;
   searching the second binary tree to determine in which instantiated segment the new peer ID belongs;
   determining that the predetermined maximum for the instantiated segment in which the new peer ID belongs has been reached;
   searching the third binary tree to determine if there is an uninstantiated segment that overlaps the instantiated segment in which the new peer ID belongs when the predetermined maximum has been reached; and
   instantiating a new cache segment when the step of searching the third binary tree identifies the uninstantiated segment that overlaps the instantiated segment in which the new peer ID belongs.

20. The method of claim 17, further comprising the steps of:
   receiving a new peer ID discovered by the peer-to-peer name resolution system;
   searching the second binary tree to determine in which instantiated segment the new peer ID belongs;

determining that the predetermined maximum for the instantiated segment in which the new peer ID belongs has been reached;

searching the third binary tree to determine if there is an uninstantiated segment that overlaps the instantiated segment in which the new peer ID belongs; and randomly replacing a peer ID in the instantiated segment in which the new peer ID belongs when the step of searching the third binary tree does not identify any uninstantiated segment that overlaps the instantiated segment in which the new peer ID belongs.

21. The method of claim 16, wherein the system includes at least a second locally registered peer IDs, further comprising the step of instantiating a fourth cache segment covering a fraction of the first cache segment and centered at the second locally registered peer ID upon receipt of an additional peer ID discovered by the peer-to-peer name resolution system after the number of peer IDs populated in the first cache segment reaches a predetermined maximum, the instantiation of the fourth cache segment resulting in an exclusion in the first cache segment.

22. The method of claim 21, wherein the second and the fourth cache segments overlap to an extent, further comprising the step of combining the second and the fourth cache segments into a single cache segment to eliminate duplication of information in the second and the fourth cache segments.

23. The method of claim 21, wherein the second locally registered peer ID is unregistered by the peer-to-peer name resolution system, further comprising the steps of uninstantiating the fourth cache segment.

24. The method of claim 16, wherein the step of instantiating the second cache segment covering a fraction of the first cache segment comprises the step of instantiating the second cache segment covering one-tenth of the first cache segment, and wherein the step of instantiating the third cache segment covering a fraction of the second cache segment comprises the step of instantiating the third cache segment covering one-tenth of the second cache segment.

25. A computer-readable medium having computer-executable instructions for performing the steps of claim 16.

26. A cache memory architecture for use in a peer having at least a first locally registered peer ID within a peer name space, the name space having an unknown number of peer IDs registered therein, comprising:

a first cache memory segment for storing peer IDs instantiated anywhere in the peer name space, the first cache memory segment having a predetermined maximum number K of peer IDs that may be stored therein, wherein K is a positive integer;

a second cache memory segment instantiated when the first cache memory segment exceeds the predetermined maximum number of peer IDs, the second cache memory segment spanning a range of $1/(K/2)$ the first cache memory segment centered at the first locally registered peer ID, the second cache memory segment forming an exclusion in the first cache memory segment, the second cache segment having a predetermined maximum number K of peer IDs that may be stored therein; and a third cache memory segment instantiated when the second cache memory segment exceeds the predetermined maximum number of peer IDs, the third cache memory segment spanning a range of $1/(K/2)$ the second cache memory segment centered at the first locally registered peer ID, the third cache memory segment forming an exclusion in the second cache memory segment, the third cache memory segment having a predetermined maximum number K of peer IDs that may be stored therein.

27. The cache memory architecture of claim 26, further comprising a fourth cache memory segment instantiated when the third cache memory segment exceeds the predetermined maximum number of peer IDs, the fourth cache memory segment spanning a range of $1/(K/2)$ the third cache memory segment centered at the first locally registered peer ID, the fourth cache memory segment forming an exclusion in the third cache memory segment.

28. A cache memory architecture for use in a peer having at least one locally registered peer ID within a peer name space, the peer name space having a first number of peer IDs instantiated therein, the first number of peer IDs having an average spacing therebetween, comprising:

a second number N of memory regions for storing peer IDs, wherein the second number N is a positive integer, each memory region from 1 . . . N storing peer IDs within a range of $+/-K^{1 \cdots N}$ times the average spacing from the at least one locally registered peer ID, wherein K is a positive integer greater than 1, and when is greater than one each of the memory regions 2 . . . N excluding the peer IDs stored in preceding memory regions 1 . . . N−1; and wherein the number N of memory regions is determined approximately as the log base K of the first number of peer IDs instantiated in the name space.

* * * * *